2,669,447

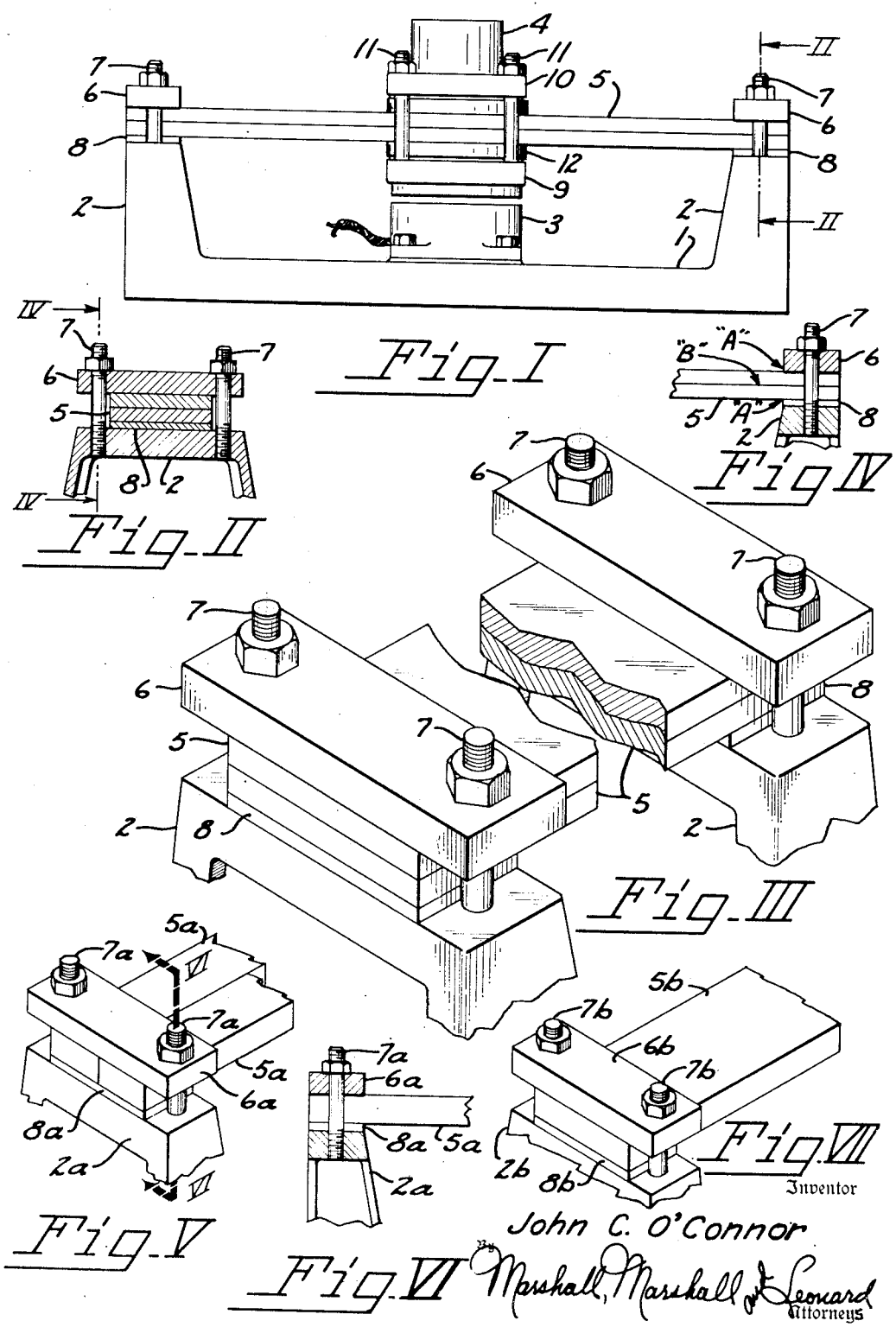
Feb. 16, 1954 — J. C. O'CONNOR — 2,669,447
APPARATUS FOR TRANSMITTING INTENSE VIBRATIONS FOR PERFORMING WORK
Filed Jan. 31, 1950
Inventor
John C. O'Connor
by Marshall, Marshall & Leonard
Attorneys Patented Feb. 16, 1954

UNITED STATES PATENT OFFICE 2,669,447

APPARATUS FOR TRANSMITTING INTENSE VIBRATIONS FOR PERFORMING WORK

John C. O'Connor, Ann Arbor, Mich., assignor to The O'Connor Patent Company, Ann Arbor, Mich., a corporation of Michigan Application January 31, 1950, Serial No. 141,438

1 Claim. (Cl. 267—1)

This invention relates to apparatus for performing work by vibration and more particularly to apparatus of this type which is equipped with a vibratory work performing system in which the work performing members and the resilient vibration transmitting members on which they are supported, constitute the elements of a tuned system. The particular invention has to do primarily with specific improvements in the means for transmitting the vibrations to the actual work performing members, such means constituting one of the elements of the tuned vibratory system.

In machines which perform work by vibration, the vibration may be created either directly on the work performing elements of the machine or it may be created elsewhere in the machine and merely transmitted to the work performing elements. In either case the work performing elements almost invariably are mounted upon spring means which in turn is supported upon the base or major portion of the machine. In U. S. Patent No. 2,353,492 I disclose and claim a "vibration producing mechanism" in which the work performing elements and their mounting springs constitute a tuned vibratory system, operating in resonance. In the structures disclosed in that patent the vibrations are created in the base of the machine and transmitted to the work performing elements of the machine through the medium of the springs themselves. When such machines, or other similar machines, are designed for the performing of operations such as compacting concrete blocks, filling barrels, drilling, tamping earth and other heavy duty operations, the horsepower input into the machines is so high and, by virtue of the tuned condition of the vibratory work performing system, the resulting amplitudes of vibration of the working elements and their supporting springs so great that the problem of life of the springs themselves is extremely important.

In U. S. Patent No. 2,439,219 I disclose and claim a system for mounting laterally extending, transversely vibrating beam springs in rubber mounting pads which are bonded to the springs themselves. In the investigations which led to the development of the invention disclosed in Patent No. 2,439,219 it was thought that the best materials for the transmission of intense vibrations were wood or high tensile strength steels. In working with hard woods and high tensile strength steels it was found that some sort of cushioning means was necessary between the beams themselves and the portions of the pieces of the machine in which they were mounted. It was discovered that rubber pads emplaced between these members of the machine would prevent their damaging each other and greatly lengthen the lives of the springs themselves. It also was found, however, that it was necessary to bond the rubber mounting pads to the spring structure in order to prevent the generation of excessive heat which shortly would tear down and destroy the rubber mounting pads.

All of the investigations which led to these earlier developments proceeded along the line of finding materials having extremely high tensile strength and extremely high Young's moduluses of elasticity, at least high with respect to their damping characteristics or structure such as in leaf contruction, it being thought that these characteristics were essential in a spring which could be constructed and subjected to many millions of intensive vibrations with heavy horsepower input.

In the course of these investigations little consideration was given to the reduction in weight of the material used for the springs because machines such as concrete block compacting machines, barrel loading machines, etc., are extremely heavy machines having bases made from steel slabs weighing thousands of pounds, built heavy for dependability, low maintenance costs and substantial indestructibility. During the course of development of commercial embodiments of the machines disclosed in the two mentioned patents, the life of the springs employed became the most important problem of all, even when high carbon content springs were used. Because of the very large number of stress reversals in springs used in machines operating at 3600 R. P. M. continuously even low stress conditions produced fatigue failures at the edges of the clamps which retained the springs on the base of the machines. It was soon learned that the recommended life of six million reversals had little meaning in these machines when ferrous springs were employed even at fatigue limit stresses below 20,000 pounds per square inch. In fact, springs were modified to have stresses below 10,000 pounds per square inch for steel and below 3000 pounds per square inch for wood to minimize fatigue failures and reduce internal molecular damping. Even though the machines used were scientifically and practically among the best which had been developed for performing the functions for which they had been designed, a spring superior to anything heretofore developed was required to facilitate the commercialization of the machines.

The well-known properties of materials such as steel and steel alloys, including quantities of material such as tungsten, molybdenum, nickel, etc., all of which were known to have high tensile strength and high Young's moduluses of elasticity, naturally led the investigation along the lines of the selection of a steel alloy exhibiting the best properties under test. Even with the careful selection of the steel alloys to be used in the springs it was found that their lives still were not sufficient to render the machines commercially practicable. After an intensive effort had been devoted to the development and selection of an appropriate steel alloy, the investigations into the properties of various alloys of this nature came to a halt because no success had been achieved.

It was then found that, completely contrary to expectations resulting from the known qualities of the material, the most effective beam springs for the transmission of high amplitude vibrations of great force having the longest life could be constructed from certain aluminum alloys.

It is, therefore, the object of this invention to provide a spring for use in an apparatus for transmitting intense vibrations for performing work, the life of which is many times greater than that of a similar steel spring or of a spring constructed from those materials known to have high tensile strengths and high Young's moduluses of elasticity.

This object has been completely realized by the incorporation into such an apparatus of a spring constructed from an aluminum alloy having characteristics hereinafter recited, and the general construction of such a spring as well as illustrations of embodiments of the invention can be understood by reference to the drawings, in which:

Figure I is a side view, somewhat simplified, of an apparatus designed for the performing of work by intense vibrations.

Figure II is a fragmentary vertical sectional view on an enlarged scale and taken substantially along the line II—II in Figure I.

Figure III is a fragmentary perspective view of vibration transmitting elements embodying the instant invention.

Figure IV is a fragmentary vertical sectional view taken substantially from the position indicated by the line IV—IV in Figure II.

Figure V is a fragmentary perspective view generally similar to Figure III but showing a different form of spring embodying the invention.

Figure VI is a fragmentary sectional view generally similar to Figure IV but taken along the line VI—VI of Figure V.

Figure VII is a view similar to Figure V but showing another modification of vibration transmitting means constituting the invention.

According to the invention, the life of a beam type spring employed in an apparatus for performing work by intense vibrations can be lengthened several hundred per cent by the selection of a particular material for the spring. Investigations, as explained above, have led to the unobvious and completely surprising result that an aluminum alloy as a material for such a spring results in performance completely unpredictable when the characteristics of aluminum alloys themselves, as understood by the art, are studied. In the tables appearing immediately below, for example, summaries are made of the known tensile strengths of various materials expressed in pounds per square inch and of the known Young's moduluses of elasticity under tension also expressed in pounds per square inch. These figures are taken from tables appearing in "Introduction to Metallurgy" by Newton (second edition—John Wiley and Sons, Inc., New York, copyright 1938, 1947).

Table No. 1

| Material | Tensile Strength p. s. i. | Young's Modulus in Tension, p. s. i. |
|---|---|---|
| Iron | 46,000 | 30,000,000 |
| Beryllium | (not shown) | 42,700,000 |
| Nickel | 50,000 | 30,000,000 |
| Molybdenum | 300,000 | 30,000,000 |
| Tungsten | 700,000 | 60,000,000 |
| Copper | 36,000 | 16,000,000 |
| Zinc | 16,000 | (not shown) |
| Silver | 40,000 | 10,300,000 |
| Tin | 10,000 | 7,000,000 |
| Aluminum | 8,500 | 10,000,000 |

From this table it can be seen that high tensile strength and high Young's moduluses of elasticity in tension, are to be expected from iron and its various alloys and thus from steel where the basic tensile strength of iron is 46,000 pounds per square inch with a Young's modulus of 30,000,000 and where the principal alloying metals range in tensile strength from 50,000 pounds per square inch for nickel, to 700,000 pounds per square inch for tungsten, and similar Young's modulus ranges of from 30,000,000 to 60,000,000 for nickel and tungsten respectively. From these metals and from combinations of these metals it could, therefore, be assumed that the greatest life of a beam vibrating as a spring transversely to its length, could be expected from iron or steel made by combining iron with the metals having higher tensile strengths and Young's moduluses.

Indeed, according to Newton (quoted above) on page 118 this would be the expected result. There Newton says:

"The endurance limit seems to be more closely related to the tensile strength of a metal than to any other property. The ratio of endurance limit to tensile strength is the endurance ratio. For most steels, the endurance ratio is about 50 per cent, for cast iron about 33 per cent, and for some nonferrous metals it may fall as low as 25 per cent."

Proceeding on this basis, therefore, one would assume that a high endurance limit (as desired in a spring to be used for the transmission of high amplitude, intense vibrations) would result from the use of materials having high tensile strengths. It was, therefore, completely unexpected when it was found that aluminum alloy had the greatest endurance limits of all the materials which had been developed for this purpose to date.

Other references to the art fail to reveal that aluminum alloys would be expected to have these characteristics. For example, in "Handbook of Nonferrous Metallurgy" (McGraw-Hill Book Company, 1945, Donald M. Liddell, Editor-in-Chief) on page 22, the tensile strengths of aluminum alloys are given as between 14,000 and 38,000 pounds per square inch. This maximum figure of 38,000 pounds per square inch for aluminum alloy hardly compares favorably even with the tensile strength per square inch of iron itself without alloying which, is as revealed by the above table is 46,000 pounds per square inch. Indeed a maximum tensile strength of 38,000 pounds per square inch for aluminum alloys places them approximately in the same category as copper with a tensile strength of 36,000 pounds per square inch. Unfortunately, no figures have been discovered showing the Young's modulus of aluminum alloys but, because of the apparent generally direct relationship between tensile strength and Young's modulus, and basing the proportions on the comparison between tensile strength and Young's moduluses in the above table, it would be expected that aluminum alloys should have a maximum Young's modulus of not more than, say, 18,000,000.

Therefore, if the investigation had proceeded as indicated in the texts outlined above and if the search for a material having a high endurance limit had followed the indications of these reference works, it would have been restricted to those materials having high tensile strength. It has been completely unexpected, therefore, to find that some aluminum alloys possess the extremely advantageous characteristic of not breaking down under many, many millions of reversals made at high amplitude in the most powerful vibratory generators built.

Flexible aluminum alloy springs designed for use in apparatus for the performance of work by vibration may take different forms. In a device such as that shown in Figure I of the drawings and which is shown in the drawings merely by way of illustration, the machine proper consists in a base 1 provided with pedestals 2 and an electromagnet 3 for the creation of force to be turned into vibrations for the performance of work. A work performing element 4, or vibratory member, is carried on a vibration transmitting element or spring 5 which is shown as existing in the form of a beam extending across the upper ends of the pedestals 2 and supporting the work performing element 4 at, or near, its mid point. The work performing element 4 may be a mold box, for example, for the manufacture of concrete blocks, or a portion of a conveyor, or a platform on which barrels can be packed or, in fact, any structure to be vibrated or to perform work by vibration. The ends of the spring 5 are tightly clamped on the upper ends of the pedestals 2 by means of clamping bars 6 which are tightened downwardly on top of the beams or spring 5 by pairs of heavy clamping studs 7 which pass through the clamping bars 6 and are threaded into the upper ends of the pedestals 2. In order to apply force more tightly to the spring 5, its ends may be supported upon hardened clamping pads 8 which may rest upon the upper surfaces of the pedestals 2 and thus the pedestals 2 may be made of non-hardened material such as cast iron.

In the embodiment of the invention shown in Figures I, II, III and IV the spring 5 consists of a pair of flexible alluminum alloy beams clamped in face to face contact. In an actual commercial embodiment of the invention and which was constructed for the purpose of compacting concrete blocks of the type used for foundation walls and other construction jobs, each of the two flexible aluminum alloy beams making up the spring 5 consisted in a block of aluminum 1¾ inches thick, eight inches wide and 48 inches long and the work performing element 4 consisted in a mold for the casting of four concrete blocks.

In a simple vibration device such as that illustrated in Figure I, vibration is imparted to the work performing element 4 by the action of the electromagnet 3 upon an armature 9 which forms one-half of a clamping member comprising a plate 10 and pairs of clamping studs 11 and which serves to clamp the work performing element 4 to the center portion of the spring 5. As in the case of the end clamps by means of which the spring is clamped on top of the pedestals 2, a hardened steel plate 12 may be provided which is actually clamped against the flexible aluminum springs. The material of which the springs in the various embodiments are composed must be sufficiently crush resistant not to fail under high clamping pressure, either by flowing or by shattering or crumbling.

It is interesting to note that not only does the use of an aluminum alloy as a spring for such a device greatly lengthen the life of a vibration transmitting member of an apparatus of this type but the use of suitable aluminum alloy for the spring also does away with the necessity for the use of bonded rubber pads such as those disclosed and claimed in Patent No. 2,439,219 and the clamping can, therefore, be straight metal-to-metal contact between the pedestals 2 or hardened steel clamping pads 8 or 12 and the hardened stell clamping bars 6. As will be explained later, it is believed that the nature of aluminum as a ductile metal and the fact that it is a good conductor of heat, alleviates the great problem encountered when other substances such as wood or steel are used in springs of this type and are clamped directly in metal-to-metal contact.

After many millions of reversals of vibrations at amplitudes of approximately six "g" acceleration or greater on springs of the dimensions outlined above had been experienced, it was found that absolutely no fatigue cracks had been created at the points marked with the letters "A" in Figure IV which were the places at which such fatigue cracks would be expected to start. Indeed, in the use of high carbon content steel and other steels having high tensile strength and high Young's moduluses of elasticity, it was precisely at the points "A" that the fatigue cracks started which resulted in complete destruction of the springs. The starting of fatigue cracks at the points "A" also was experienced when springs made of hard wood were employed.

An interesting phenomenon, however, does occur at the points indicated by the letters "A". After a considerable operation it was discovered that the hardened edges of the steel clamping members 6 and 8 had gradually indented their way into the surfaces of the aluminum alloy beams, cold working and changing the spring surface and indeed, after approximately two years of operation, the surfaces of the aluminum beams beneath the hardened steel clamping members have been found to be indented as much as one-thirty-second of an inch, showing wear but still serviceable.

Another interesting phenomenon in the operation of a vibration transmitting element constructed from two facing aluminum alloy beams such as are disclosed in Figures I through IV, was the development of a crack at the point indicated by the reference character "B" in Figure IV. After much study it was found that because of the intensive vibrations of the two beams 5, dirt which sifted in between the beams tended to move outwardly to collect at the point indicated by the letter "B". Gradual accumulation at this point of considerable quantity of dust, built up a local fatigue point which eventually resulted in the starting of fatigue cracks across the beams. This source of failure of the beams was eliminated by the modification of the invention illustrated in Figures V and VI.

As shown in Figures V and VI a pair of beams for a spring 5a for the machine can be horizontally adjacent. In the actual concrete compacting machine, these beams were three inches thick by four inches wide by 48 inches long. This resulted in the same natural frequency as that present in the modification shown in Figures I through IV where the two springs were 1¾ inches by eight inches by 48 inches long. However, this change eliminated the horizontally facing surfaces of the two beams and thus there was no point at which dirt could accumulate and, therefore, no local focal point for fatigue cracks to start. As in the modification shown in Figures I through IV, the two beams forming the spring 5a are tightly clamped to the top of the pedestals 2a by means of clamping studs 1a acting through clamping bars 6a of hardened material and bottom hardened clamping pads 8a. All of the advantages which have been found to exist in the use of a selected aluminum alloy for the spring member in an apparatus for transmitting high intensity vibrations of a large amplitude, also existed in this form of the invention. The change in the shape of the particular springs employed from two relatively flat rectangular beams 1¾ inches thick by eight inches wide to two beams three inches thick by four inches wide, had no appreciable effect either on the amount of force required to induce vibrations of an amplitude of six "g" acceleration, or on power loss in the operation of the machine. The sole result was a greatly increased life of the springs due to the elimination of the collection point for dust and dirt which drifted in between the two springs illustrated in Figures I through IV.

The success achieved by this change in the shape of the two beams forming the spring 5a leads to the next development; a single spring three inches by eight inches in cross section such as that illustrated in Figure VII where the spring 5b again is clamped on top of pedestals 2b by clamping studs 1b acting through top clamping bars 6b and bottom hardened clamping pads 8b.

Either of the forms illustrated in Figures V and VI or in Figure VII eliminates the sole difficulty encountered with the form of the invention illustrated in Figures I through IV, viz., the accumulation of dirt and creation of a local fatigue crack at the point marked with the letter "B."

The result achieved by the selection of an aluminum alloy, in direct contravention to the expected results of a selection of a material having such low tensile strength and Young's modulus of elasticity, has been the prolongation of life of springs in a commercial concrete block compacting machine embodying the invention set forth in my earlier Patent No. 2,353,492 from approximately three months to over two years. The reasons for this greatly prolonged life are not completely understood because the material selected, viz., aluminum alloy, does not possess the characteristics of high tensile strength and high Young's modulus of elasticity and thus a high "endurance ratio" and its phenomenal success for this purpose is completely unpredictable and un-understandable. However, because of this excessively long life and the consequent saving in the tremendous cost of such heavy-duty springs and the costly job of replacing them, its employment in the structure disclosed and claimed in U. S. Patent No. 2,353,492 has resulted in the complete success of the structure and its rapid and effective commercialization. The alloys known commercially as "14S," "24S" and "75S" and similar alloys are suitable. In general, aluminum alloys having the higher tensile strengths appear to be most effective but there seems to be some characteristic in addition to tensile strength which is extremely important in this application of the material. Indeed, were high tensile strength the only consideration, as has been indicated in the literature on the subject of endurance limits, it is at once obvious that materials such as steel alloyed with nickel, molybdenum, tungsten, beryllium and similar materials having high tensile strengths and high Young's moduluses of elasticity, should perform better for such purpose than the relatively very low tensile strength aluminum alloys. It has been conjectured that the elimination of fatigue failures which has resulted from the use of aluminum alloys for these heavy-duty vibration transmitting elements might well result from one or more of such characteristics as annealing properties, malleability and freedom from notch sensitiveness. The precise reasons, however, since directly contrary to the expected results exhibited by the literature in the prior art, remain to be discovered.

While applicants for patents are not required to set forth, or even to know, the scientific reasons for phenomena exhibited by devices of their invention, and while this applicant is in no wise bound by any theory that he may advance as to the reasons for the long useful life of the springs described herein, calling attention to some obvious and unobvious advantages may make clearer the manner in which the various inherent properties of flexible aluminum alloys mutually contribute to achieve the highly useful result of the applicant's discovery.

An obvious advantage of embodying an aluminum alloy spring instead of steel is plain reduction in weight. The unitary aluminum bar also is obviously simpler in construction and less expensive to produce than the laminated steel bar. A less obvious advantage is the greater amplitude of vibration which is made possible by the capability that a unitary aluminum alloy spring has a vibrating through greater amplitudes than those through which a comparable unitary steel spring tuned to the same frequency could be vibrated without power input requirements beyond the range of practicability. A steel spring constructed to give the same output as the aluminum spring of the applicant's invention would have to be built up of laminae. Hence, a considerable part of the power input to the steel spring would be absorbed by inter-leaf friction. It is to be remembered that the applicant's springs in their preferred forms are solid bars 3 inches thick and 48 inches long and that even heavier bars are contemplated.

The roles, whatever they are, that malleability and annealing properties and cold working properties of selected aluminum alloys play in increasing the resistance to cracking at the spring clamps are wholly unobvious. The clamps pein indentations into the springs adjacent the clamp edges without promoting the formation of cracks, and the fact that the toughness of the aluminum bar in and adjacent to the indentations does not disappear under millions of flectures may indicate that malleability, annealing properties and cold working properties act either separately or perhaps in conjunction to impart and preserve the toughness which resists cracking. And perhaps the freedom from notch sensitiveness in fatigue is an important factor.

Glass, which has approximately the same modulus of elasticity as aluminum, will crack under slight stress if it has acquired even a slight notch. Steel has notch sensitiveness to a lesser degree than glass. But aluminum alloys such as are embodied in the applicant's invention have incomparably less notch sensitiveness than steel. The high thermal conductivity of the aluminum spring, which rapidly dissipates the heat generated by molecular friction and by the scuffing action of the clamp against the flexing beam, also may contribute to the better functioning of the device. The aluminum oxide which forms between the clamp and the beam may contribute antifriction effects which minimize heating and abrasion. Or the combination of aluminum and iron oxides may have some such beneficial action, as contrasted with the known abrasive action of ferric and ferrous oxides which are produced by rubbing corrosion.

The plasticity of the aluminum crystals and their bonds probably is an important factor in enabling them to resist the almost inconceivable abuse to which they are subjected by the crushing clamping pressures that distort them, the rending pushes and pulls that tend to tear them apart and the chopping impacts of the clamp corners.

In the applicant's device the spring is subjected to hundreds of millions of intense vibrations every one of which tends to wrench the spring from its moorings. By the instant invention the applicant has achieved higher acceleration in vibrated masses than have ever before been practicable, and at the same time has multiplied the useful life span of the vibratory mechanism. He has accomplished these useful results by employing a vibratory beam made of metal which in other relations is relatively frail in combination with rigid clamps of hard metal, which prior to the applicant's invention would be expected to have the maximum damaging effect on the weaker metal of the beam.

Having thus described the invention, I claim:

In apparatus for transmitting intense vibrations for performing work, in combination, a thick beam of flexible aluminum alloy, said beam having flat surfaces, pairs of clamps of steel, said clamps having flat surfaces, and means for clamping said beam between the clamps of each pair with the flat surfaces of the clamps engaging the flat surfaces of the beam, said clamps being adapted for connection to vibration generating means and vibration receiving means.

JOHN C. O'CONNOR.

References Cited in the file of this patent

UNITED STATES PATENTS

| Number | Name | Date |
|---|---|---|
| 1,846,326 | Flint | Feb. 23, 1932 |
| 2,062,760 | Overstrom | Dec. 1, 1936 |
| 2,253,267 | Dietrich | Aug. 19, 1941 |
| 2,439,219 | O'Connor | Apr. 6, 1948 |

OTHER REFERENCES

"Spring Material Substitutes Have Unconsidered Qualities" by W. W. Boyd, pages 112–113 of Product Engineering, February 1943.